H. A. BARTHOLOMEW.
Horseshoe-Calk.

No. 210,398.  Patented Dec. 3, 1878.

Witnesses:
Edw. W. Dond
D. P. Cowl

Inventor:
Henry A. Bartholomew
by Jno. W. Dungan
Atty

UNITED STATES PATENT OFFICE.

HENRY A. BARTHOLOMEW, OF BROOKLYN, NEW YORK.

IMPROVEMENT IN HORSESHOE-CALKS.

Specification forming part of Letters Patent No. 210,398, dated December 3, 1878; application filed August 7, 1878.

*To all whom it may concern:*

Be it known that I, HENRY A. BARTHOLOMEW, of Brooklyn, in the county of Kings and State of New York, have invented certain new and useful Improvements in Horseshoe-Calks; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention is an improvement in horseshoes, and has for its object to provide easy means for attaching and detaching calks, to be used in winter weather to prevent horses from slipping.

It consists in forming in the upper surface of an ordinary horseshoe a slot or groove, into which may be placed a screw-threaded nut to receive the screw end of a bolt having for its head a calk of a suitable pattern. An opening is provided in the shoe, in the middle of the aforesaid slot, (not screw-threaded,) through which passes said bolt-shank.

Figure 1:
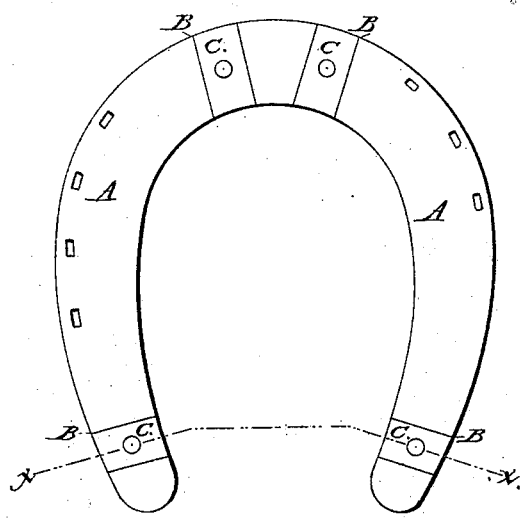
Figure 2:
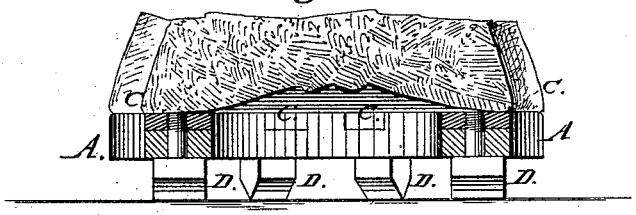

In my drawings, Figure 1 is a plan view of a shoe, showing the nut in position in its slot and the end of the bolt. Fig. 2 is a section, showing the calk as applied to the shoe.

Similar reference-letters indicate like parts in all of the figures.

Referring to drawings, A is the shoe, provided with the ordinary nail-holes. B is the slot formed in the upper face of the shoe. C is the nut, which fits neatly into the slot provided for it. D is the calk, with its extended bolt passing through a hole in the shoe, and held in position by the nut C.

In applying my device, the shoe having been previously nailed to the hoof of the animal, I slide the nut C into its slot, and take one of the calks and place its extended bolt through the hole in the shoe, and screw it up tightly until the shoulder of the calk bears hard against the under surface of the shoe.

It will be readily appreciated that the calk may be detached in mild weather, or when calks would be objectionable, by simply unscrewing the calk and withdrawing the nut.

I have shown the slot in the shoe as rectangular in its formation, although in practice I do not wish to be debarred from using a dovetail or wedge-shaped groove, or both combined, to receive correspondingly-shaped nuts.

When in use without my device applied, there is a liability to have the hole in the shoe and slot filled with dirt; but this can readily be removed by an ordinary nail, which may be used to punch the dirt inward toward the foot of the horse, and forced out through the slot made in the shoe.

The shoe may be prepared for two or more calks by simply forming the slots to receive the nuts and the hole to receive the shank of the bolt.

I am aware that calks have been applied to shoes heretofore by screw-bolts with nuts bearing upon the upper surface of the shoe, and to such I make no claim.

I am aware that English Patent No. 492 of 1873 to H. G. Cardoza shows a projection on the side of the shoe, and that it also shows a rough or calk to fit in said projection, with screw attached, and nut to fasten said rough in said projection, and to such form of construction I make no claim.

What I claim as new, and desire to secure by Letters Patent, is—

In combination with shoe having the slot B, the calk D, provided with bolt and nut C, as and for the purpose set forth.

In testimony that I claim the foregoing as my own I affix my signature in presence of two witnesses.

HENRY A. BARTHOLOMEW.

Witnesses:
FRANK S. WINCHESTER,
W. S. LEVENS.